Figure 1:
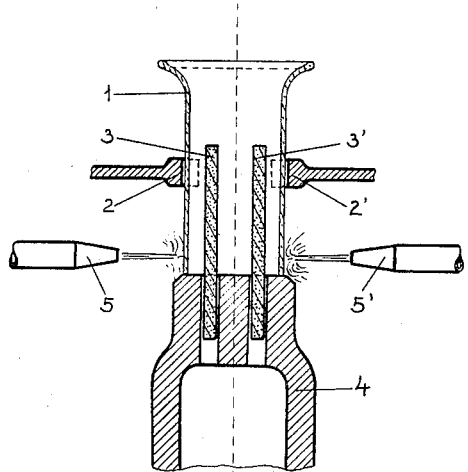

Aug. 8, 1933.                P. SELÉNYI                1,921,139
                            DISCHARGE TUBE
                          Filed May 13, 1930

Inventor
Paul Selényi
by Karlkark
      Atty.

Patented Aug. 8, 1933

1,921,139

UNITED STATES PATENT OFFICE 1,921,139

DISCHARGE TUBE

Paul Selényi, Budapest, Hungary, assignor to Egyesült Izzólámpa és Villamossagi rt., Ujpest, Hungary, a Corporation of Hungary Application May 13, 1930, Serial No. 451,999, and in Austria and Hungary May 28, 1929

4 Claims. (Cl. 250—27.5)

My invention relates to discharge tubes comprising a hollow glass body, more particularly of quartz glass. Such discharge tubes may be used as Crookes-tubes, X-ray tubes, electron tubes, incandescent lamps, quartz lamps, photo cells, eudiometer-tubes or the like. If such tubes are manufactured from quartz glass, they have mechanical, thermal, and optical properties, for instance a permeability for ultraviolet rays, which render them suitable for many purposes. It is well known in the art that the airtight sealing of metal wires forming electrical leads in tubes made of glass having a low thermal coefficient of expansion is a very difficult task, quite especially in the case of quartz glass tubes, the thermal expansion of which is the smallest known of any kind of glass. Therefore such tubes have hitherto been provided with electrical leads ground in the glass and packed by means of suitable adhesives. It is further well known in the art to seal in a quartz glass tube a series of concentric glass pipes having a decreasing percentage of quartz, in the innermost of which a tungsten or molybdenum wire is sealed, but the manufacture of such composite leads is difficult and expensive.

It is an object of my invention to provide a discharge tube, the electrical leads of which may be sealed in the tube body directly in the same manner as such leads are sealed in common glass. According to my invention I provide an electrical lead consisting of a glass rod, more particularly a quartz glass rod having a metal coating and sealed in the discharge tube body. A glass rod consisting of the same material as the tube body may be sealed in the body in a highly efficient manner, since no destructive strains or stresses are produced if the body and the rod are heated to the same temperature. Owing to the thinness of the coating applied to the glass rod, its thermal expansion is negligible as compared to that of the glass rod and therefore a very efficient airtight seal of the electrical leads in the wall of the glass body is obtained. The manufacture of such tubes is very simple. Rods or strips of the desired dimensions are manufactured from the material of the tube body and the coating is deposited on the rods by any method well known in the art. The coating may consist of platinum, iridium or tantalum which may be deposited on the glass in an efficient manner by burning-in, by cathode atomization or by condensing metal vapors in a vacuum.

The metal-coated glass rods are sealed in the body in an analogous manner as electrical leads consisting of metal. The rods may be sealed in the tube walls directly or indirectly by means of a socket sealed in the tube wall. In each case attention should be paid to the fact that the rods do not suffer deformations which might destroy the uniformity of the metal coating. Thus the glass rod should not be heated to the melting point of the coating material. This may be accomplished by choosing for the rod a material the melting temperature of which is higher than the melting temperature of the material of the tube body or of the socket, or the sealing step should be performed in such manner that the rod is heated less than the tube body or the socket.

In the drawing affixed to this specification and forming part thereof some embodiments of my invention are illustrated diagrammatically by way of example.

In the drawing

Figure 2:
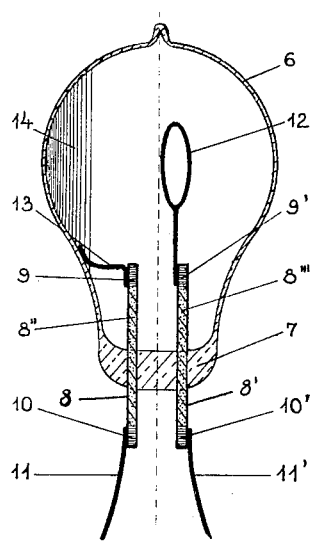

Fig. 1 is an axial section of a device adapted for sealing electrical leads, while Fig. 2 is a similar view of a photo cell according to my invention.

Referring now to Fig. 1, 1 is a socket tube having a flaring upper portion. The tube 1 is held by jaws 2, 2'. The electrical leads 3 and 3' are mounted in a support 4. All parts can be rotated about a vertical axis by means, not shown. 5 and 5' are gas burners heating the lower end of the tube 1 to the desired temperature. When the quartz glass forming the tube 1 has become soft, it is pressed against the electrical leads 3 and 3' by means of jaws (not shown). It should be noted that the leads 3, 3' are not influenced directly by the burning gas so that their temperature is always lower than that of the tube 1, whereby disadvantageous deformations are avoided. The rods 3, 3' may be formed as flat strips of elliptic or rectangular cross section arranged in such manner that the larger sides of the cross section are parallel to the operating surfaces of the pressing jaws. If quartz glass is used, a further advantage is obtained by the fact that in consequence of the low coefficient of expansion disadvantageous cooling strains are not produced on the pressure line, even if at the moment of pressing the tube together its temperature is substantially higher than that of the leads 3, 3'.

Referring now to Fig. 2, 6 is the hollow quartz glass body of a photo cell with a thickened bottom portion 7 in which the electrical leads 8 and 8' are sealed. The metal coatings 8'', 8''' applied to the leads are thickened at the ends at 9, 9', 10, 10'. To the thickened portions 10, 10' the outer wires 11, 11' are attached while the inner thickened portions 9, 9' are connected to a wire 13 and to an anode metal ring 12, respectively. The wire 13 is connected to the photo-electrical cathode 14 consisting of sodium, potassium or amalgams of these metals and introduced in the tube by means of the pumping pipe or the like. If desirable the leads 8, 8' may have a flat cross section.

The leads according to my invention constitute the current path from the outside to the inside of the tube. The outside current path may be formed by metal conductors well known in the art which are attached to the leads by pressure or the like. Sometimes it may be desirable to thicken the outer ends of the metal coating by galvanic methods or the like so that the connection may be soldered or welded to them. In the same manner the inner ends of the coatings may be thickened. In the event that the electrodes are not sealed directly in the tube, but in the socket, the sealing of the electrodes in the socket and the mounting of the conducting wires may be performed in a manner well known in the art and the sockets prepared in this manner may be sealed in the tubes.

In the claims the term "glass" is intended to include quartz glass.

I wish it to be understood that I do not desire to be limited to the exact details of construction shown and described for obvious modifications will occur to a person skilled in the art.

I claim:—

1. In combination with a hollow quartz glass body, a glass rod extending through the wall and into the interior of said glass body and in contact with and sealed in this wall, and a continuous electrically conductive coating on those parts of said glass rod, which extend outside, inside and through the wall of said glass body, said coating forming a conductor adapted to lead the electrical current across the wall of said body.

2. In combination with a hollow quartz glass body, a glass rod extending through the wall and into the interior of said glass body and in contact with and sealed in this wall, and a continuous electrically conductive coating on those said parts of said glass rod, which extend outside, inside and through the wall of said glass body, said coating consisting of a metal of the group of metals formed by platinum, iridium and tantalum and forming a conductor adapted to lead the electrical current across the wall of said body.

3. In combination with a hollow quartz glass body, a glass rod extending through the wall and into the interior of said glass body and in contact with and sealed in this wall, and a continuous electrically conductive coating on those parts of said glass rod, which extend outside, inside and through the wall of said glass body, said coating consisting of iridium metal and forming a conductor adapted to lead the electrical current across the wall of said body.

4. In combination with a hollow quartz glass body, a glass rod extending through the wall and into the interior of said glass body and in contact with and sealed in this wall, and a continuous electrically conductive coating on those parts of said glass rod, which extend outside, inside and through the wall of said glass body, said coating consisting of tantalum metal and forming a conductor adapted to lead the electrical current across the wall of said body.

PAUL SELÉNYI.